United States Patent [19]

Reed

[11] Patent Number: 4,918,472

[45] Date of Patent: Apr. 17, 1990

[54] WATERPROOF CAMERA WINDOW

[76] Inventor: Thomas T. Reed, 215 Alison Ave., Rohnert Park, Calif. 94928

[21] Appl. No.: 369,322

[22] Filed: Jun. 21, 1989

[51] Int. Cl.$^4$ ............................................. G03B 17/08
[52] U.S. Cl. ..................................................... 354/64
[58] Field of Search ......................................... 354/64

[56] References Cited

U.S. PATENT DOCUMENTS 4,714,333  12/1987  Tamamura et al. .................. 354/64
4,803,504  2/1989  Maeno et al. ......................... 354/64
4,811,039  3/1989  Maeno et al. ......................... 354/64

Primary Examiner—Michael L. Gellner
Assistant Examiner—Brian W. Brown
Attorney, Agent, or Firm—Larry D. Johnson

[57] ABSTRACT

A waterproof camera window provides a transparent, unitary protective cover that seals both the light source and camera lens and a submersible camera, and comprises a generally planar, optically transparent window bearing a non-transparent masked portion incorporated into its outer and inner surfaces, in the area between the light source and the camera lens.

5 Claims, 1 Drawing Sheet

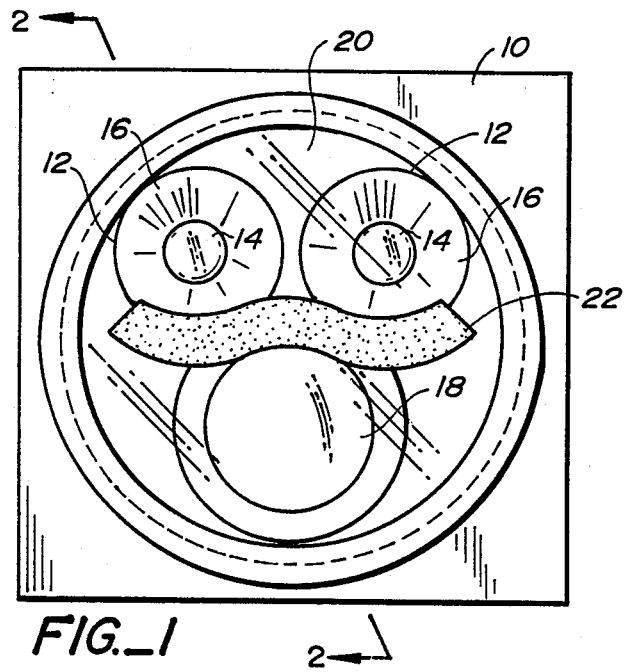
FIG._1
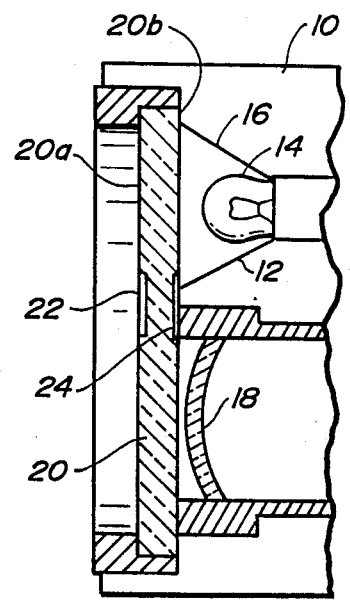
FIG._2
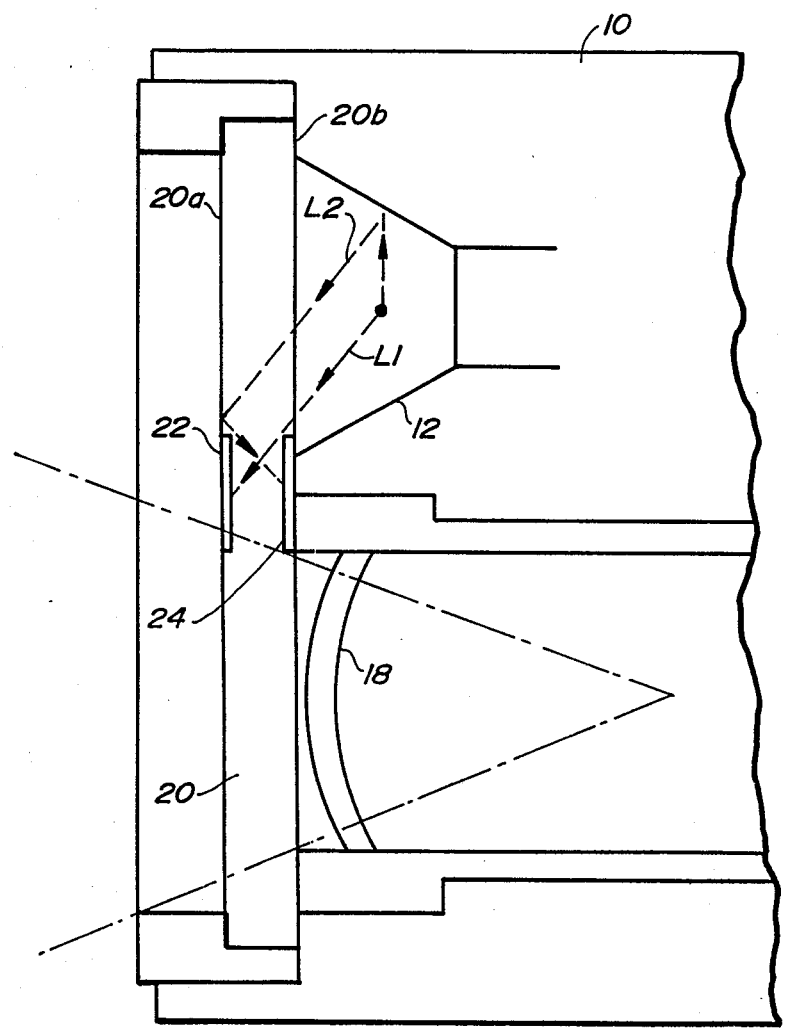
FIG._3

WATERPROOF CAMERA WINDOW

BACKGROUND OF THE INVENTION

1. Field of the Invention

This invention relates generally to optical lenses and seals, and more specifically to an improved waterproof camera window.

2. Description of the Prior Art

Special cameras are often used for submersible photographic applications, or in pipelines, sewer lines, or other hostile environments. Typically, the cameras used in these situations are remote devices that are housed in a sturdy, waterproof casing, and are pulled, pumped or otherwise driven through the pipeline or other environment to optically record the status of the environment. Most such systems require an accompanying light source to illuminate the otherwise darkened environment. Ideally, the light source and camera lens are mounted close together behind a single lens or window, thus minimizing the external dimensions of the camera, and reducing the number of windows, and thus the number of corresponding seals, required in the device. However, placement of the light source in this position can be problematic, in that the light rays from the light source may be prematurely reflected by the inside surfaces of the window itself directly back into the camera lens, causing glare, color light shift, and overall loss of quality in the optical image received by the user.

SUMMARY OF THE INVENTION

The waterproof camera window of this invention provides a transparent, unitary protective cover that seals both the light source and camera lens of a submersible camera. The invention comprises a generally planar, optically transparent window, which bears a nontransparent "masked" portion or strip incorporated into its outer (environment side) surface and inner (light source and camera lens side) surface, in the area between the light source and the camera lens. These masked portions are created by etching, frosting, painting or otherwise altering the light transmission characteristics of that portion of the otherwise normally reflective outer and inner surfaces.

The masked portions of the camera window prevent reflected light from entering the camera lens in two ways. "First-generation" reflections, those light rays from the light source that would normally reflect off the outer window surface and immediately back towards the camera lens, are absorbed or scattered by the outer surface masked portion. In addition, "second-generation" reflections, those light rays from the light source that would normally reflect off the outer window surface (for example, adjacent the outer surface masked portion), then off the inner window surface, and finally for a second time off the outer window surface and back towards the camera lens, are absorbed or scattered by proper positioning of the inner surface masked portion. (Note: depending on the particular geometry of the light source and camera window, there may even be third, fourth or greater generation reflections, which would also be absorbed or scattered by proper positioning of the inner surface masked portion). Thus, the only light entering the camera lens is light reflected from completely outside the camera window, i.e., from the outside environment, or objects in the environment.

Use of the waterproof camera window of this invention enables close placement of the light source and camera lens in a submersible camera, thereby minimizing the external dimensions of the camera. In addition, this waterproof camera window allows both the light source and camera lens to use the same, unitary window as a seal against the environment, reducing the cost of manufacture.

BRIEF DESCRIPTION OF THE DRAWINGS

FIG. 1 is a front elevational view of a submersible camera head incorporating a waterproof camera window of this invention;

FIG. 2 is an elevated cross-sectional view of the submersible camera head incorporating the waterproof camera window of this invention, this view being taken along line 2—2 of FIG. 1; and FIG. 3 is an enlarged cross-sectional schematic view of the submersible camera head incorporating the waterproof camera window of this invention, illustrating the relationship of the camera lens, camera window, and the light ray paths from the light source.

DETAILED DESCRIPTION OF A PREFERRED EMBODIMENT

FIG. 1 is a front elevational view of a submersible camera head 10. Camera head 10 includes one or more light sources 12 consisting of a high-intensity bulb 14 and reflector 16, and a camera lens 18 for a camera apparatus (behind the lens, not shown). Camera window 20 comprises a one-piece cover to shield and seal the light source and camera lens within the 10 camera head 10 and away from the ambient environment. Masked area 22 prevents light rays from the light source 12 from being reflected back into the camera lens 18 by the window 20, as will be discussed infra.

FIG. 2 is an elevated cross-sectional view of the submersible camera head 10 incorporating the waterproof camera window 20, this view taken along line 2—2 of FIG. 1. This view illustrates the unitary seal provided by window 20 for the light 12 and camera lens 18. In addition, this view illustrates outer surface masked area 22 on the outer (environment side) surface 20a of window 20, and inner surface masked area 24 on the inner (light source and camera lens side) surface 20b of window 20.

Camera window 20 is preferably made of polished quartz, pyrex or similar material, approximately one-quarter inch in thickness, and of a shape and diameter to adequately cover and seal the light source and camera window. The outer and inner surface masked areas 22, 24 may be incorporated into the outer and inner surfaces 20a, 20b, respectively, of the window 20 in many ways. For example, the masked areas may be created by bead (sand) blasting the desired shape onto the window, yielding a resultant etched area. These etched areas have the appearance of frosted glass, and may be painted to emphasize their location. The effect of this etching is to absob, rather than reflect, the incident light from the light source, thereby preventing the undesirable reflection of light toward the camera lens. The size and configuration of the etched areas are determined by the particular geometrical relationships of the light source(s) and camera lens, but typically extend in a strip along the area between the two.

FIG. 3 is an enlarged cross-sectional schematic view of the submersible camera head 10 incorporating the waterproof camera window 20. This view illustrates the relationship of the camera lens 18, camera window 20, and the light ray paths from the light source 12. Light path L1 is illustrative of a "first generation" reflection light path, which normally would be reflected off the outer window surface 20a and back towards the camera lens 18, but instead is absorbed by outer surface masked area 22. Light path L2 is illustrative of a "second generation" reflection light path, which normally would be reflected off the outer window surface 20a, then off the inner window surface 20b, and then off the outer window surface for a second (or more) time towards the camera lens. This light path is absorbed by inner surface masked area 24, and thus prevented from reaching the camera lens.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A window for an submersible camera, said camera including a light source for generation and emission of light rays, and further including a camera lens, said window comprising:

- a generally planar, optically transparent window member, of a size to cover both said light source and said camera lens, said window member having an outside surface and an inside surface;
- a first mask portion on said window member outside surface, said first masked portion located between said light source and said camera lens and conditioned to alter the optical reflectivity of light rays emitted from said light source; and
- a second mask portion on said window member inside surface, said second masked portion located between said light source and said camera lens and conditioned to alter the optical reflectivity of light rays emitted from said light source.

2. The window of claim 1 wherein said first mask portion comprises a surface conditioned to absorb at least some portion of said light rays.

3. The window of claim 1 wherein said first mask portion comprises a surface conditioned to scatter at least some portion of said light rays.

4. The window of claim 1 wherein said second mask portion comprises a surface conditioned to absorb at least some portion of said light rays.

5. The window of claim 1 wherein said second mask portion comprises a surface conditioned to scatter at least some portion of said light rays.

* * * * *